(12) United States Patent
Boss et al.

(10) Patent No.: US 8,380,190 B2
(45) Date of Patent: Feb. 19, 2013

(54) LOCATION-BASED TUNING SERVICES FOR WIRELESS LAN DEVICES

(75) Inventors: Gregory Jensen Boss, American Fork, UT (US); Rick Allen Hamilton, II, Charlottesville, VA (US); James McGirr, Venice, FL (US); Philip Kendal Mullins, Richmond, TX (US)

(73) Assignee: International Business Machines Corporation, Armonk, NY (US)

( * ) Notice: Subject to any disclaimer, the term of this patent is extended or adjusted under 35 U.S.C. 154(b) by 1002 days.

(21) Appl. No.: 11/427,953

(22) Filed: Jun. 30, 2006

(65) Prior Publication Data

US 2008/0004000 A1  Jan. 3, 2008

(51) Int. Cl.
*H04W 4/00* (2009.01)
*H04W 24/00* (2009.01)
*H04W 36/00* (2009.01)
*H04W 72/00* (2009.01)

(52) U.S. Cl. ............ 455/433; 455/423; 455/456.1; 455/440; 455/441; 455/450; 370/328; 370/332

(58) Field of Classification Search .......... 455/433, 455/423, 456.1, 440, 441, 450; 370/328, 370/332
See application file for complete search history.

(56) References Cited

U.S. PATENT DOCUMENTS

| | | | | |
|---|---|---|---|---|
| 5,222,249 A * | 6/1993 | Carney | ............ | 455/452.1 |
| 5,715,516 A * | 2/1998 | Howard et al. | ............ | 455/422.1 |
| 5,867,785 A * | 2/1999 | Averbuch et al. | ............ | 455/436 |
| 6,141,565 A * | 10/2000 | Feuerstein et al. | ............ | 455/560 |
| 6,191,708 B1 * | 2/2001 | Davidson | ............ | 701/204 |
| 6,711,408 B1 * | 3/2004 | Raith | ............ | 455/440 |
| 6,970,183 B1 | 11/2005 | Monroe | | |
| 6,983,156 B2 | 1/2006 | Fukushima et al. | | |
| 6,990,428 B1 | 1/2006 | Kaiser et al. | | |
| 2003/0142647 A1 * | 7/2003 | Agrawal et al. | ............ | 370/331 |
| 2004/0058678 A1 * | 3/2004 | deTorbal | ............ | 455/437 |
| 2004/0105439 A1 | 6/2004 | Kitami et al. | | |
| 2005/0073983 A1 * | 4/2005 | Diener | ............ | 370/338 |
| 2005/0101340 A1 * | 5/2005 | Archiable | ............ | 455/522 |
| 2006/0229104 A1 * | 10/2006 | de La Chapelle et al. | . | 455/562.1 |
| 2007/0142050 A1 * | 6/2007 | Handforth et al. | ............ | 455/436 |

* cited by examiner

*Primary Examiner* — Ariel Balaoing
(74) *Attorney, Agent, or Firm* — Yee & Associates, P.C.; Arthur J. Samodovitz

(57) ABSTRACT

A computer implemented method, apparatus, and computer usable program code for location-based tuning for a mobile wireless platform. A current geographic location of the mobile wireless platform is determined on a route being traveled by the mobile wireless platform. Radio frequency conditions are sensed in a path of the mobile wireless platform. Radio frequency conditions are detected at the current geographic location of the mobile wireless platform as the mobile wireless platform travels along the route. An optimal channel is determined for the current geographic location. The optimal channel maximizes communications of the mobile wireless platform based on the radio frequency conditions. The mobile wireless platform transitions channels to the optimal channel in response to determining the optimal channel. One or more wireless devices transition to the optimal channel to communicate with the mobile wireless platform.

12 Claims, 7 Drawing Sheets

| CHANNEL ID | CENTER FREQUENCY | AMERICAS | EMEA | JAPAN | ISREAL | CHINA |
|---|---|---|---|---|---|---|
| *1 | 2412 | X | X | X | | X |
| 2 | 2417 | X | X | X | | X |
| 3 | 2422 | X | X | X | X | X |
| 4 | 2427 | X | X | X | X | X |
| 5 | 2432 | X | X | X | X | X |
| *6 | 2437 | X | X | X | X | X |
| 7 | 2442 | X | X | X | X | X |
| 8 | 2447 | X | X | X | X | X |
| 9 | 2452 | X | X | X | X | X |
| 10 | 2457 | X | X | X | | X |
| *11 | 2462 | X | X | X | | X |
| 12 | 2467 | | X | X | | |
| 13 | 2472 | | X | X | | |
| 14 | 2484 | | | X | | |

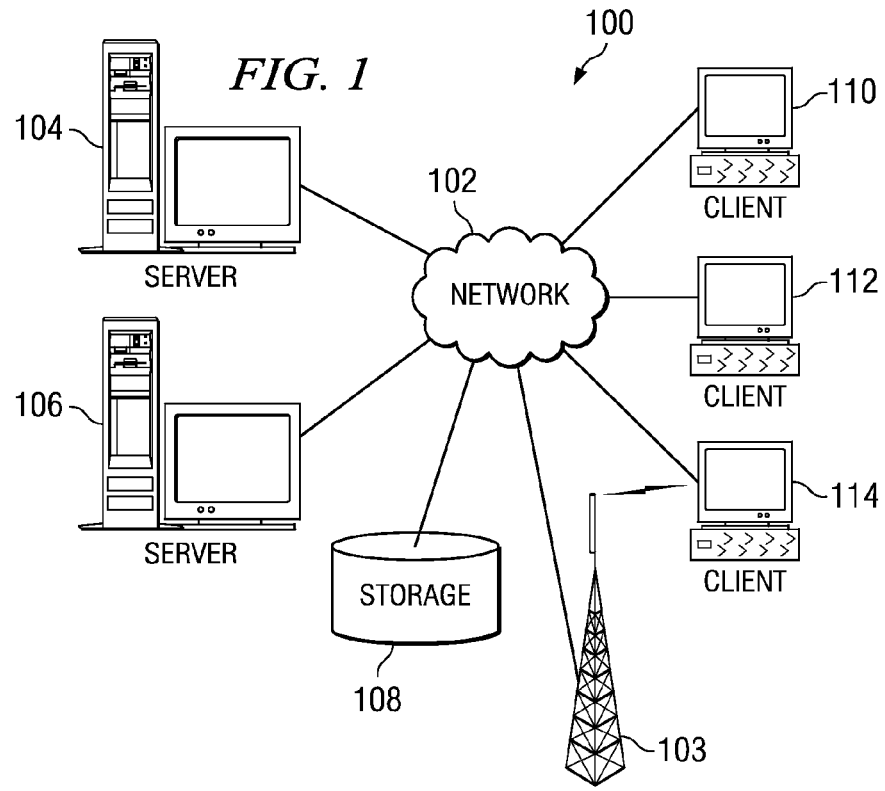

*FIG. 3*

| CHANNEL ID | CENTER FREQUENCY | AMERICAS | EMEA | JAPAN | ISREAL | CHINA |
|---|---|---|---|---|---|---|
| *1 | 2412 | X | X | X | | X |
| 2 | 2417 | X | X | X | | X |
| 3 | 2422 | X | X | X | X | X |
| 4 | 2427 | X | X | X | X | X |
| 5 | 2432 | X | X | X | X | X |
| *6 | 2437 | X | X | X | X | X |
| 7 | 2442 | X | X | X | X | X |
| 8 | 2447 | X | X | X | X | X |
| 9 | 2452 | X | X | X | X | X |
| 10 | 2457 | X | X | X | | X |
| *11 | 2462 | X | X | X | | X |
| 12 | 2467 | | X | X | | |
| 13 | 2472 | | X | X | | |
| 14 | 2484 | | | X | | |

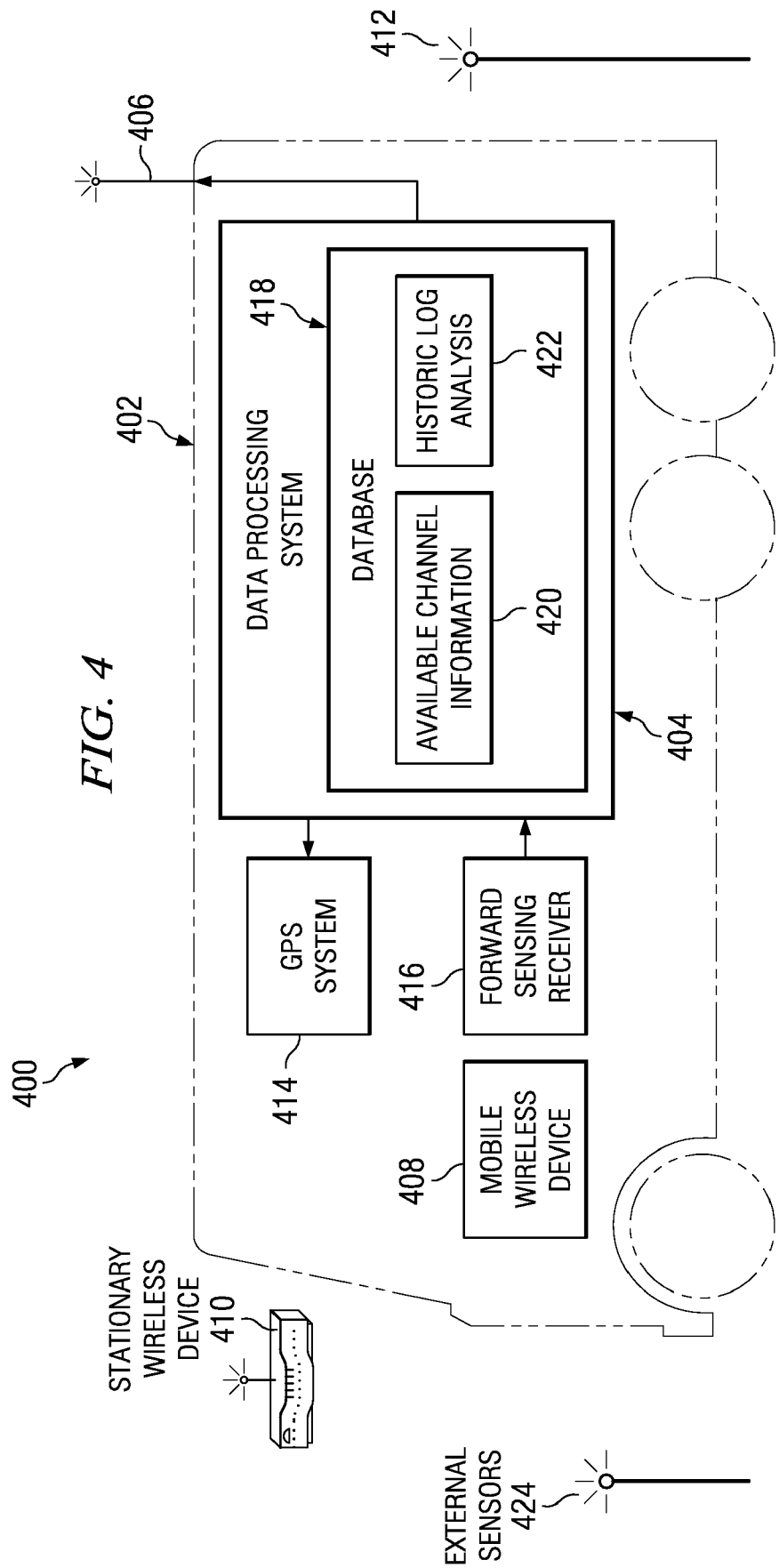

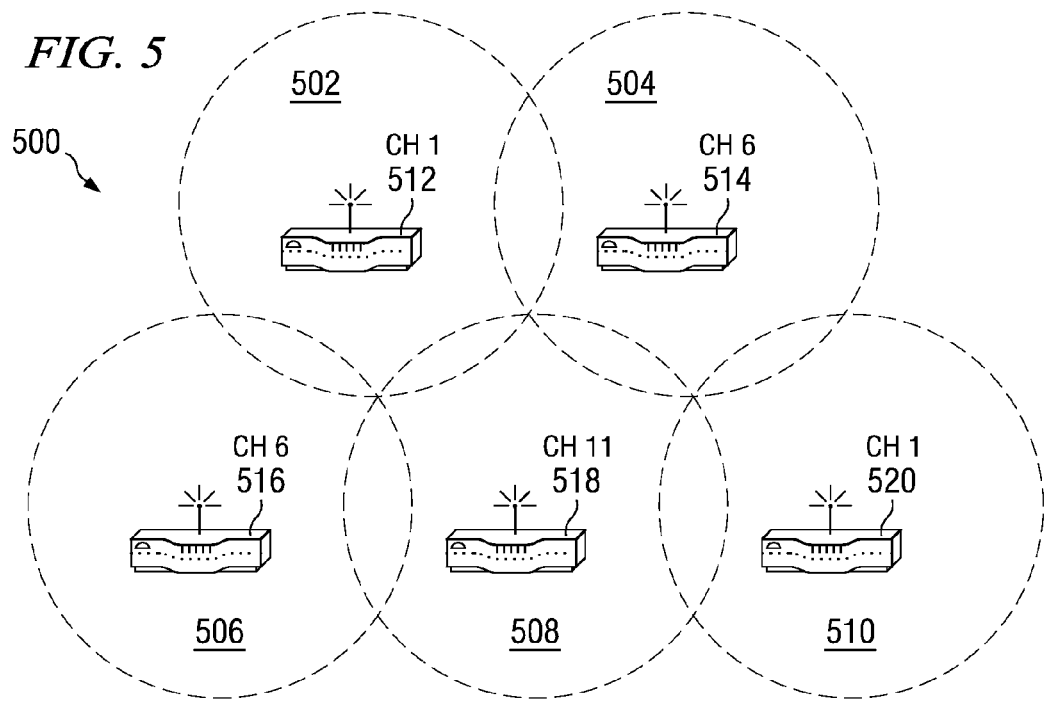
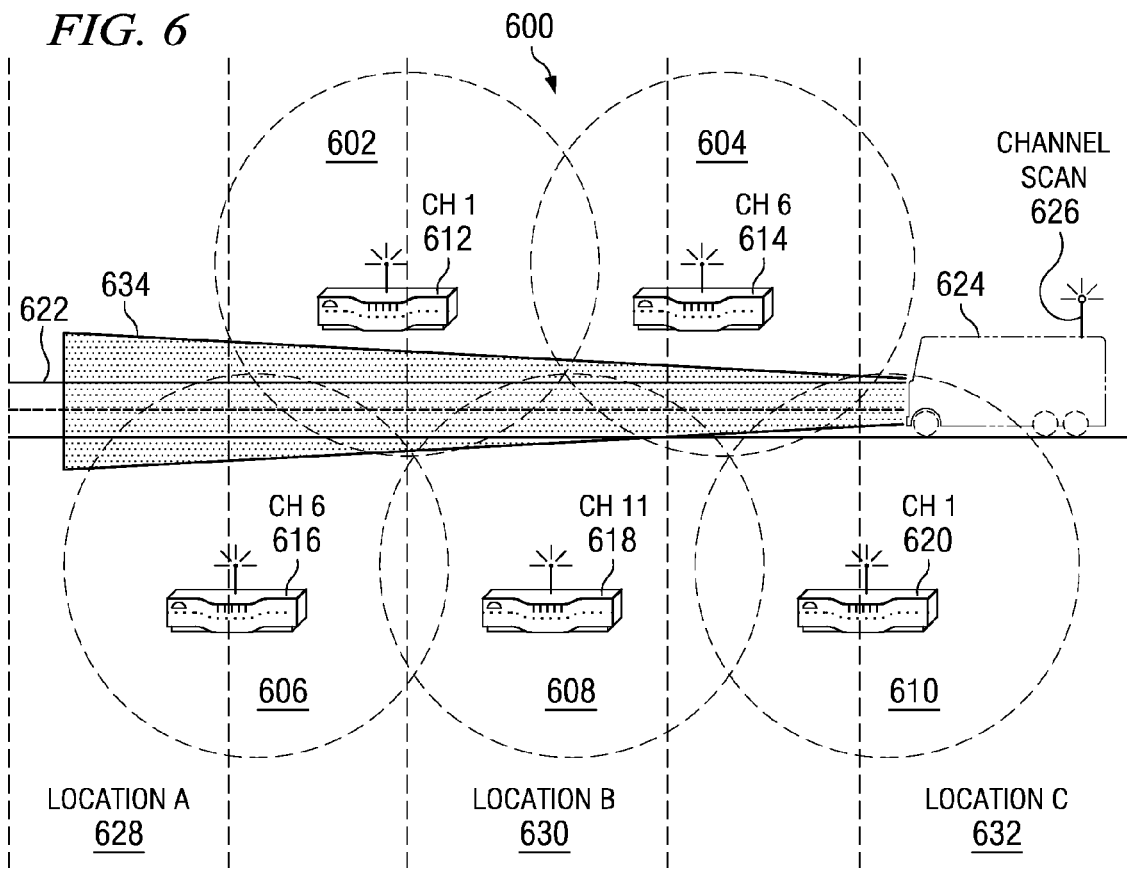

| LOCATION | PREFERRED CHANNEL | FREQUENCY (GHz) | BASE STATION ASSOCIATION | MINIMUM SIGNAL LEVEL THRESHOLD IN dBm (BEFORE SWITCHING CHANNELS) | MINIMUM SNR THRESHOLD IN dB (BEFORE SWITCHING CHANNELS) |
|---|---|---|---|---|---|
| 11TH ST STATION | 11 | 2462 | A | -77 | 18 |
| PLAZA CENTRAL STATION | 6 | 2437 | B | -80 | 16 |
| GREENBRIAR AVE STATION | 1 | 2412 | C | -78 | 17 |
| 3RD ST & PIKE RD STATION | 11 | 2462 | D | -77 | 18 |
| PARK AVE STATION | 6 | 2437 | E | -79 | 16 |
| ○○○ | ○○○ | ○○○ | ○○○ | ○○○ | ○○○ |

LOCATION-BASED TUNING SERVICES FOR WIRELESS LAN DEVICES

BACKGROUND OF THE INVENTION

1. Field of the Invention

The present invention relates generally to data communications and more particularly, to a computer implemented method, apparatus, and computer usable program code for location-based tuning services for wireless local area network devices.

2. Description of the Related Art

The use of wireless local area networks (WLAN) has grown nearly exponentially in recent years. Advancing wireless technology and the sheer number of data processing systems able to access wireless networks have virtually assured that the use of wireless technologies will continue to grow.

One of the issues confronting wireless local area network implementations arises when traditionally fixed radio systems are deployed on mobile platforms. For example, many busses and trains incorporate wireless networks for communicating data, such as position, status, and video coordination. This deployment of mobile platforms results in a lack of channel coordination between the mobile platform and co-located fixed systems deployed along routes.

The result is a continually changing noise environment which negatively impacts performance of the mobile platform. In this case, an optimized solution for location "A" may differ significantly for the same hardware set from an optimized solution in location "B". Accordingly, in such a mobile environment, a solution tuned for an initial location may suffer severe degradation once the platform has to move to another location.

A practical example of such a moving environment may be the use of wireless local area networks in trains where devices may be used to transmit critical quality of service (QoS) data, such as video transmissions. Another example may involve the train moving through a stationary radio frequency environment found in a densely populated business or residential sector. In such a scenario, radio frequency transmissions from the train may encounter significant interference with wide/local/city area wireless networks for the period of time the train takes to move through that sector. Other mobile examples exist as well. For example, the predefined movement of parts through a large factory where radio frequency conditions exist may vary widely from location to location.

Currently, three non-overlapping ranges within twelve channels are in ubiquitous use for wireless local area network devices. However, each device may encounter problems when attempting to prescribe a given channel in advance. This is particularly difficult given that channel settings which are optimal for one location, such as a train station, may differ drastically from the best channel in a crowded urban environment many miles away.

Some attempts have been made to detect dynamically changing radio frequency background noise and change the channels according to real-time radio frequency conditions. Besides requiring more costly circuitry and higher bandwidth to compensate, attempted solutions are prone to frequency thrashing, and in addition, fall short of the latency guarantees needed for certain wireless applications.

SUMMARY OF THE INVENTION

The illustrative embodiments provide a computer implemented method, apparatus, and computer usable program code for location-based tuning for a mobile wireless platform. A current geographic location of the mobile wireless platform is determined on a route being traveled by the mobile wireless platform. Radio frequency conditions are sensed in a path of the mobile wireless platform. Radio frequency conditions are detected at the current geographic location of the mobile wireless platform as the mobile wireless platform travels along the route. An optimal channel is determined for the current geographic location. The optimal channel maximizes communications of the mobile wireless platform based on the radio frequency conditions. The mobile wireless platform transitions channels to the optimal channel in response to determining the optimal channel. One or more wireless devices transition to the optimal channel to communicate with the mobile wireless platform.

BRIEF DESCRIPTION OF THE DRAWINGS

The novel features believed characteristic of the illustrative embodiments are set forth in the appended claims. The illustrative embodiments themselves, however, as well as a preferred mode of use, further objectives, and advantages thereof, will best be understood by reference to the following detailed description of an illustrative embodiment when read in conjunction with the accompanying drawings, wherein:

FIG. 1 is a pictorial representation of a data processing system in which the illustrative embodiments may be implemented;

FIG. 2 is a block diagram of a data processing system in which the illustrative embodiments may be implemented;

FIG. 3 is a table of allocated channels for exemplary wireless frequencies in accordance with the illustrative embodiments;

FIG. 4 is an exemplary mobile wireless environment in accordance with an illustrative embodiment;

FIG. 5 is a graphical representation of ranges for channels in different wireless networks in accordance with the illustrative embodiments;

FIG. 6 is a graphical representation of channel sensing in a wireless environment in accordance with the illustrative embodiments;

DETAILED DESCRIPTION OF THE PREFERRED EMBODIMENT

Figure 7:
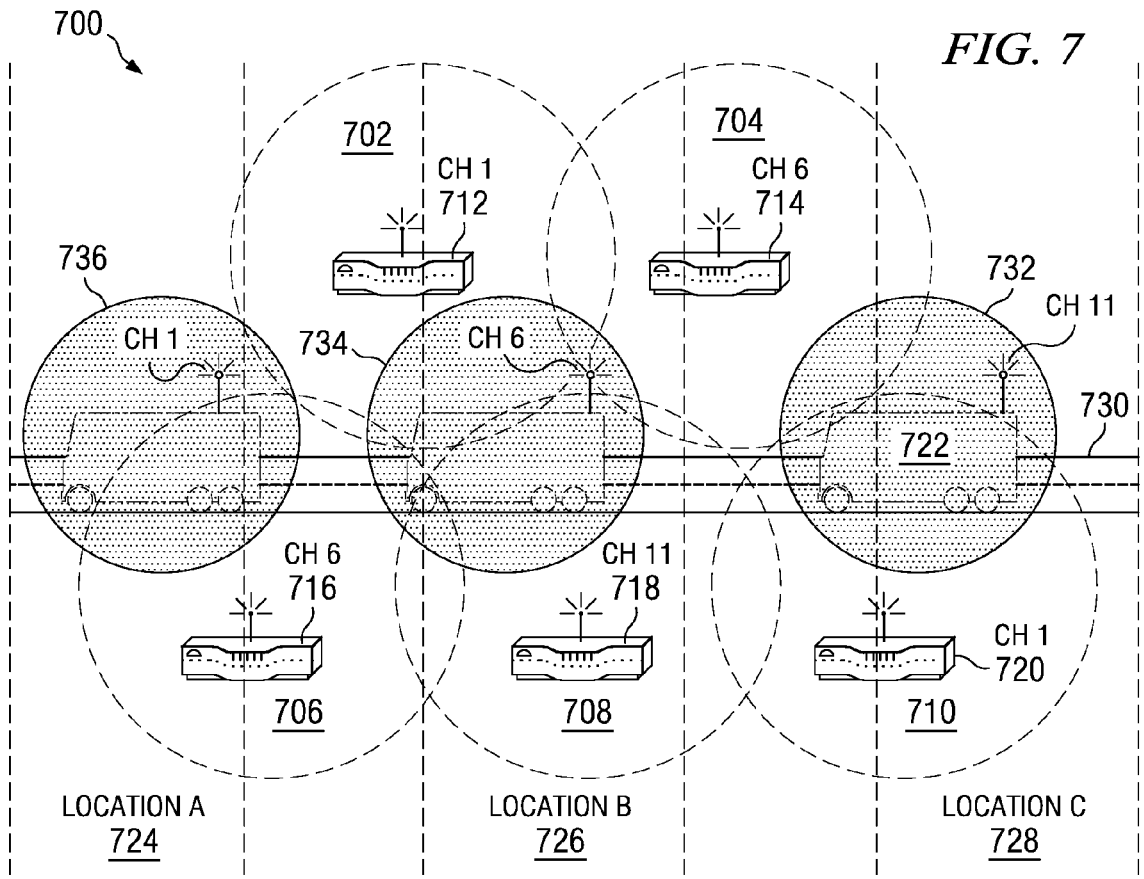
FIG. 7 is a graphical representation of channel sensing in a wireless environment in accordance with the illustrative embodiments.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables. In one example, wireless access link 103 is an example of a connection within network 102 that allows for any number of computing devices to connect with network 102 wirelessly.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Clients 110, 112, and 114 may be connected to network 102 by land lines or wirelessly through wireless access link 103. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to NB/MCH 202. Graphics processor 210 may be coupled to NB/MCH 202 through an accelerated graphics port (AGP), for example.

In the depicted example, local area network (LAN) adapter 212 is coupled to SB/ICH 204. Audio adapter 216, keyboard and mouse adapter 220, modem 222, read only memory (ROM) 224, universal serial bus (USB) ports and other communication ports 232, and PCI/PCIe devices 234 are coupled to SB/ICH 204 through bus 238. Hard disk drive (HDD) 226 and CD-ROM drive 230 are coupled to SB/ICH 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be coupled to SB/ICH 204.

An operating system runs on processing unit 206 and coordinates and provides control of various components within data processing system 200 in FIG. 2. The operating system may be a commercially available operating system, such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as HDD 226 and may be loaded into main memory 208 for execution by processing unit 206. The processes of the illustrative embodiments may be performed by processing unit 206 using computer implemented instructions, which may be located in a memory such as, for example, main memory 208, ROM 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data.

A bus system may be comprised of one or more buses, such as a system bus, an I/O bus and a PCI bus. Of course, the bus system may be implemented using any type of communication fabric or architecture that provides for a transfer of data between different components or devices attached to the fabric or architecture. A communications unit may include one or more devices used to transmit and receive data, such as a modem or a network adapter. The communications unit may also be a wireless adapter communicating with a wireless access link. A memory may be, for example, main memory 208 or a cache such as found in NB/MCH 202. A processing unit may include on or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

FIG. 3 is a table of allocated channels for exemplary wireless frequencies in accordance with the illustrative embodiments. Wi-Fi, short for "Wireless Fidelity," is the popular term for high-frequency wireless access to a network, usually a local area network (LAN). Such local wireless networks are rapidly gaining acceptance as an alternative, addition, or replacement to a wired local area network. With wireless networks, computer systems in physical proximity to one another need not be physically wired into a network connection of the local area network in order to communicate.

Wi-Fi networks have also grown in consumer use. Businesses and stores often have wireless local area networks to which individuals can connect with portable computers, such as laptops or personal digital assistants. Wi-Fi is specified in the 802.11b specification from the Institute of Electrical and Electronics Engineers (IEEE) and is part of a series of wireless specifications together with 802.11, 802.11a, and 802.11g. All four standards use the Ethernet protocol and CSMA/CA (carrier sense multiple access with collision avoidance) for path sharing. Wi-Fi networks are herein referred to as one example of wireless local area networks. The illustrative embodiments are also applicable to developing standards such as WiMAX specified by IEEE standard 802.16E. The illustrative embodiments may also be applied to emerging access technologies standards, protocols, and systems.

The illustrative embodiments may be used in conjunction with any number of wireless standards, protocols, or wireless media. In one example, the frequencies are applied to the wireless standard IEEE 802.11b/g. Table 300 illustrates different frequencies that may be used in conjunction with the wireless standard IEEE 802.11b/g. Table 300 includes channel identifications 302, center frequency 304 of each channel, and country designation 306 indicating some of the countries that use channel identifications 302.

In particular, channel 1 308, channel 6 310, and channel 11 312 are the three channels accepted for use in IEEE 802.11b/g wireless local area networks in the United States. Accepted channels for this standard may be updated as the use and demand for wireless communications continues to increase.

The illustrative embodiments provide a computer implemented method, apparatus, and computer usable program code for location-based tuning services for wireless local area network devices. In particular, the illustrative embodiments use location-based sensing as a catalyst for radio frequency channel transitions for traditionally fixed wireless local area network radio systems deployed in a mobile environment. The transitions occur automatically, allowing for channel optimization to be quickly and effectively executed. As a result, the method ensures data transmission continuity using geographic-channel fencing or Geo-Channel fencing. Geographic-channel fencing is channel transitioning based on geographic location.

In other words, a local access base station or wireless base station may enhance the station's radio system performance by sensing or otherwise determining external radio frequency interference and then adapting or changing the frequency of the operating channel to minimize the impact of the interference.

FIG. 4 is an exemplary mobile wireless environment in accordance with an illustrative embodiment. Mobile wireless environment 400 illustrates mobile wireless platform 402 in transit along a route. Mobile wireless platform 402 may be a bus, train, subway, monorail, car, semi-truck, boat, airplane, or other transportation device equipped with systems and components for radio frequency transmissions. Mobile wireless platform 402 may use various systems and devices to sense location and radio frequencies present in mobile wireless environment 400.

Data processing system 404 is used to control the communication characteristics of wireless transmitter/receiver 406. Data processing system 404 may be a computer, such as data processing system 200 of FIG. 2. Communication characteristics are the signal properties of the wireless local area network. For example, the communication characteristics may include channel, intensity, and other protocols, standards, or settings used in transmitting the wireless signal from wireless transmitter/receiver 406. Wireless transmitter/receiver 406 may be a wireless device, router, antenna, or other wireless communication element for sending and receiving data via a radio frequency.

Data processing system 404 may also be a controller. The controller may include a processor, memory, and an application specific integrated circuit (ASIC) and/or other logic devices or components for controlling the operation of the components of mobile wireless platform 402. In another embodiment, the controller may be integrated with the wireless transmitter/receiver. An application-specific circuit is a microchip designed from scratch for a specific application, such as determining an optimal channel based on geographic location and time.

Wireless transmitter/receiver 406 may transmit a signal to devices that are in transit with mobile wireless platform 402, including mobile wireless device 408. For example, mobile wireless device 408 may be a camera, onboard processor, a sensor, wirelessly linked data processing system, or any other mobile device that needs to communicate information back to a centralized location. Wireless transmitter/receiver 406 may also transmit a signal to stationary wireless device 410. For example, stationary wireless device 410 may be a traffic light, signaling device, transit controller, or other stationary wireless device. Wireless transmitter/receiver 406 may also communicate with wireless base station 412. Wireless base station 412 may be connected to a wired network or to the Internet. For example, data processing system 404 may transmit the position, speed, passenger load, temperature, and status of mobile wireless platform 402 from wireless transmitter/receiver 406 to a user through wireless base station 412.

In another example, a user riding in mobile wireless platform 402 may be using mobile wireless device 408, such as a laptop or PDA. Wireless transmitter/receiver 406 may send an IP address to the rider, and the information communicated between the laptop and wireless transmitter/receiver may be aggregated to other communications and passed to wireless base station 412 allowing the rider to access the Internet or other networks seamlessly while riding mobile wireless platform 402.

In one embodiment, mobile wireless platform 402 includes global positioning system 414. Global positioning system 414 is connected to data processing system 404 and indicates a geographic location of mobile wireless platform 402. Forward sensing receiver 416 may also connect to data processing system 404. Forward sensing receiver 416 is a detector that informs data processing system 404 of radio frequency conditions and characters sensed in the path or surrounding mobile wireless platform 402. The path is the direction of travel of mobile wireless platform 402 and may be a random path or part of a pre-defined route. For example, forward sensing receiver 416 may be able to scan or sense for wireless networks in use miles ahead of mobile wireless platform 402. The information gathered by forward sensing receiver 416 may be used by data processing system 404 to determine an optimal channel for maximizing signal throughput and minimizing noise/interference.

Data processing system 404 may also include database 418. Database 418 may be used to store available channel information 420, historic log analysis 422, and other information used by data processing system 404 to ensure communication in mobile wireless environment 400. Available channel information 420 may specify the best channel based on the location of mobile wireless platform 402. In the case that mobile wireless platform 402 travels an established route, historic log analysis 422 may indicate wireless characteristics and conditions for each position along the route so that data processing system 404 and an interconnected wireless device, such as mobile wireless device 408, stationary wireless device 410, and wireless base station 412 may communicate on a different channel if needed.

Historic log analysis 422 may also indicate radio frequency conditions based on geographic location and time. For instance, during working hours, heavy equipment used at a construction site may interfere with channel 3. As a result, data processing system 404 may transition to channel 11 before reaching the construction site.

External sensors 424 may be used to indicate the position of mobile wireless platform 402 and the radio frequency characteristics of mobile wireless environment 400. For example, external sensors 424 that are stationary may link specific geographic locations with wireless networks transmitted in the area. External sensors 424 may transmit this information to mobile wireless platform 402 to be recorded in available channel information. As a result, data processing system 404 may transition channels to not interfere with wireless networks detected by external sensors 424. For example, external sensors 424 may indicate interference for a location based on a severe car accident in which additional emergency communication devices are interfering with one or more channels. As a result, mobile wireless platform 402 changes to an available channel before reaching the interference of the geographic location.

In another example, external sensors 424 may be connected to mobile devices, such as cars, trains, and busses and collect and record radio frequency characteristics of different geographic locations.

FIG. 5 is a graphical representation of ranges for channels in different wireless networks in accordance with the illustrative embodiments. Wireless map 500 is an exemplary representation of the range or cell of different wireless networks operating on different channels or frequencies. The range is the distance or geographic boundary that a wireless signal is effectively received. Whether a signal is effectively received may be specified by a signal threshold. A signal that drops below a threshold for a receiving device is outside of the range of the transmitting device.

Wireless map 500 includes wireless networks 502, 504, 506, 508, and 510. Each of wireless networks 502, 504, 506, 508, and 510 is emitted from wireless base stations 512, 514, 516, 518, and 520, respectively. Wireless base stations may be a wireless device, router, or antenna, such as wireless access link 103 of FIG. 1.

In this illustrative example, wireless base stations 512 and 520 are running on channel 1. Wireless base stations 514 and 516 are running on channel 6. Wireless base station 518 is running on channel 11. The channels of wireless base stations 512, 514, 516, 518, and 520 correspond to channels, such as channel 1 308, channel 6 310, and channel 11 312 of FIG. 3.

FIG. 6 is a graphical representation of channel sensing in a wireless environment in accordance with the illustrative embodiments. Wireless environment 600 is a map of wireless networks, such as shown in wireless map 500 of FIG. 5, including wireless networks 602, 604, 606, 608, and 610 and wireless base stations 612, 614, 616, 618, and 620.

Route 622 passes through wireless environment 600. Route 622 is the traveling path of mobile wireless platform 624. Mobile wireless platform 624 may be a bus, train, subway, monorail, car, semi-truck, boat, airplane, or other transportation element. As a result, route 622 may be train tracks, a designated bus route, road, river, canal, air route, tunnel, or other transportation pathway. Mobile wireless platform 624 is shown in one example as a bus.

Mobile wireless platform 624 is equipped with transmitter/receiver 626 that is equipped for mobile functionality. Transmitter/receiver 626 is a communications device, such as wireless transmitter/receiver 406 of FIG. 4. The mobile functionality allows transmitter/receiver 626 to send and receive radio frequencies as mobile wireless platform 624 moves from one location to another.

Portions of route 622 within wireless environment 600 are separated into different locations including location A 628, location B 630, and location C 632. Each location has a wireless footprint or wireless condition. The wireless conditions indicate which wireless networks 602, 604, 606, 608, and 610 function within that location and the corresponding channels. As a result, the wireless condition within each location may indicate which channels may cause interference while mobile wireless platform 624 is in location A 628, location B 630, and location C 632.

Mobile wireless platform 624 may include a forward sensing receiver, such as forward sensing receiver 416 of FIG. 4 which may sense wireless conditions in range 634. Range 634 is the boundary limit of the forward sensing receiver. As a result, the forward sensing receiver may detect all of the wireless conditions within range 634.

Location Discovery Techniques

Location discovery techniques are now discussed as used to indicate the geographic location of mobile wireless platforms.

Mobile wireless platform 624 may use any number of techniques to determine geographic location along route 622. For example, mobile wireless platform 624 may use global positioning based services for "self knowledge" of location so that transmitter/receiver 626 may channel transition accordingly.

Mobile wireless platform 624 may also use ground-based triangulation techniques using radio frequency signals from three or more towers to determine device location.

Mobile wireless platform 624 may also use chronological measurement and implied location for highly time-consistent transit patterns along route 622. For example, if mobile wireless platform 624 is a subway, a timer on the subway may be used to determine location based on average velocity, previous travel patterns, and time elapsed since the last verified location. For example, in fifteen minutes, mobile wireless platform 624 will be at "Farragut North Station".

Similarly, mobile wireless platform 624 may use stop counters and other motion sensing to determine implied location. A stop count is a running count of stops and the geographic locations associated with each stop. For example, mobile wireless platform 624 may recognize the geographic location as "Farragut North Station" when the train comes to a complete stop for the fourth time. Each stop of a stop count is associated with a station, and the recognized radio frequency environment between each station may dictate necessary channel shifts. Use of a stop count is especially beneficial when route 622 is a prescribed route, but mobile wireless platform 624 tends to experience time variations when traversing route 622.

Mobile wireless platform 624 may also use a feedback loop from stationary radio frequency broadcasting towers. Towers that are already in place may be configured to send a preliminary location identification at the beginning of every transmission. Mobile wireless platform 624 may become "aware" of the current location as it passes by the broadcasting towers. A reverse triangulation method may allow more precise determinations of location by combining relative radio frequency strength with multiple broadcasting towers.

In another example, mobile wireless platform 624 uses external measure-and-adjust sensors which may make empirical measurements of external radio frequency conditions and geographic locations. The external sensors may command channel changes without the latency required of mobile solutions. The sensors may be static or dynamic sensors, such as external sensor 424 of FIG. 4. The sensors may be placed along the route, throughout a manufacturing site, or may be placed in key locations such as poles along the route. As mobile wireless platform 624 approaches the sensors, the sensors may broadcast a channel selection telling mobile wireless platform 624 to change channels. The channel selection may be a message, such as a short message service (SMS) type message to the transmitter/receiver, such as wireless transmitter/receiver 406 of FIG. 4 of mobile wireless platform 624.

FIG. 7 is a graphical representation of channel sensing in a wireless environment in accordance with the illustrative embodiments. Wireless environment 700 is a map of wireless networks, such as wireless map 500 of FIG. 5 and wireless environment 600 of FIG. 6, including wireless networks 702, 704, 706, 708, and 710 and wireless base stations 712, 714, 716, 718, and 720.

Wireless environment 700 shows mobile wireless platform 722 in location A 724, location B 726, and location C 728. In each location, the channel used by mobile wireless platform 722 is selected to minimize interference with wireless networks 702, 704, 706, 708, and 710. As a result, during all times, mobile wireless platform 722 is able to minimize interference and communicate with linked wireless devices.

External Radio Frequency Detector Functions

External radio frequency detectors are now discussed for determining radio conditions dynamically or statically in the path of mobile wireless platform 722.

Mobile wireless platform 722 uses direct or implied knowledge of locations to trigger channel-switching among the radio frequency devices. For example, global positioning information may be used to determine the channel used by mobile wireless platform 722 along route 730 based on geographic location. In another example, the periodic reading of radio frequency conditions using an external wireless sensing or detection device, such as forward sensing receiver 424 of FIG. 4, may be used to shift channels based on geographic and real-time empirical data. For example, the external detector may detect wireless networks 702, 704, 706, 708, and 710. The information regarding these networks may be used to shift channels. The external detector may be a wireless card or other wireless detection device.

In FIG. 7, mobile wireless platform 722 functions on channel 11 732 in location C 728 to ensure functionality and minimize interference with wireless network 704 and wireless network 710. In location B 726, mobile wireless platform 722 functions on channel 6 734 to ensure functionality and minimize interference with wireless network 704, wireless network 702, and wireless network 708. In location A 724, mobile wireless platform 722 functions on channel 1 736 to ensure functionality and minimize interference with wireless network 706.

Figures 8, 11:
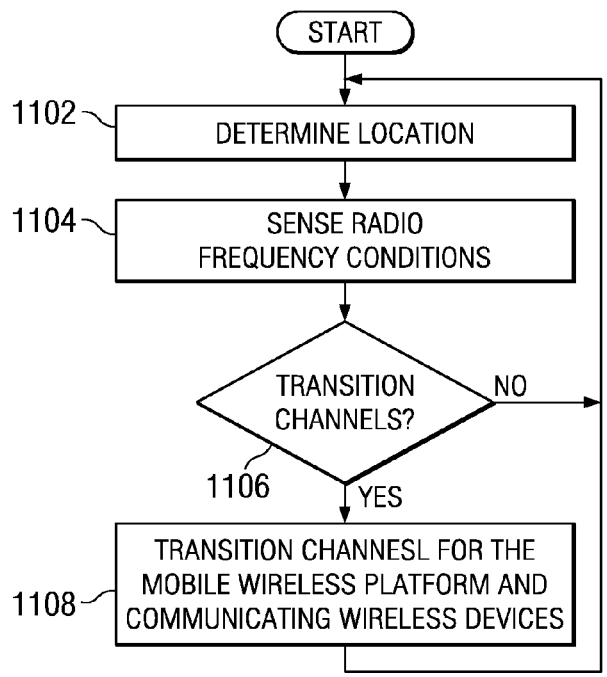
FIG. 8 is a table illustrating location-based tuning in accordance with the illustrative embodiments.
FIG. 11 is a flowchart illustrating location-based tuning in accordance with the illustrative embodiments.

FIG. 8 is a table illustrating location-based tuning in accordance with the illustrative embodiments. Table 800 may be applicable to a mobile wireless platform, such as mobile wireless platform 722 of FIG. 7. Table 800 includes location 802 of the mobile wireless platform. Table 800 includes preferred channel 804, frequency 806, base station association 808, minimum signal level threshold 810, and minimum signal to noise ratio (SNR) 812 for location 802.

Preferred channel 804 is the channel most likely to maximize the effectiveness of wireless communication in each location. Frequency 806 specifies the frequency which corresponds to channel 1 308, channel 6 310, and channel 11 312 of table 300 all of FIG. 3. Base station association 808 specifies which base station is associated with the mobile wireless platform for communication. Minimum signal level threshold 810 is the minimum signal level in decibels allowed for each location before the mobile wireless platform switches channels. Minimum signal to noise ratio 812 is the minimum signal to noise ratio in decibels allowed before switching channels.

Table 800 demonstrates the optimum available frequency based on noise variances and signal quality. The thresholds of minimum signal level threshold 810 and minimum signal to noise ratio 812 may be defined or determined based on "best practices" as well as specific application performance requirements. The best practices may entail shifting frequencies based on signal-to-noise ratios falling beneath prescribed thresholds. The best practices may also entail shifting frequencies based on certain occurrences of dropped packets in network transmissions or frequency shifts based on any other relative performance metric wherein the signal of the target mobile device may be impeded by the surrounding radio frequency environment.

For example, the hardware used in the mobile wireless platform and wireless devices communicating with the mobile wireless platform may have a low minimum signal level threshold 810 requiring the mobile wireless platform to switch channels sooner than the hardware in other communication platforms and devices.

Pre-fixed routes, such as transit routes, may impart the knowledge of forecasted coverage patterns established via radio frequency surveys and known radio signal inhibitors.

Figure 9:
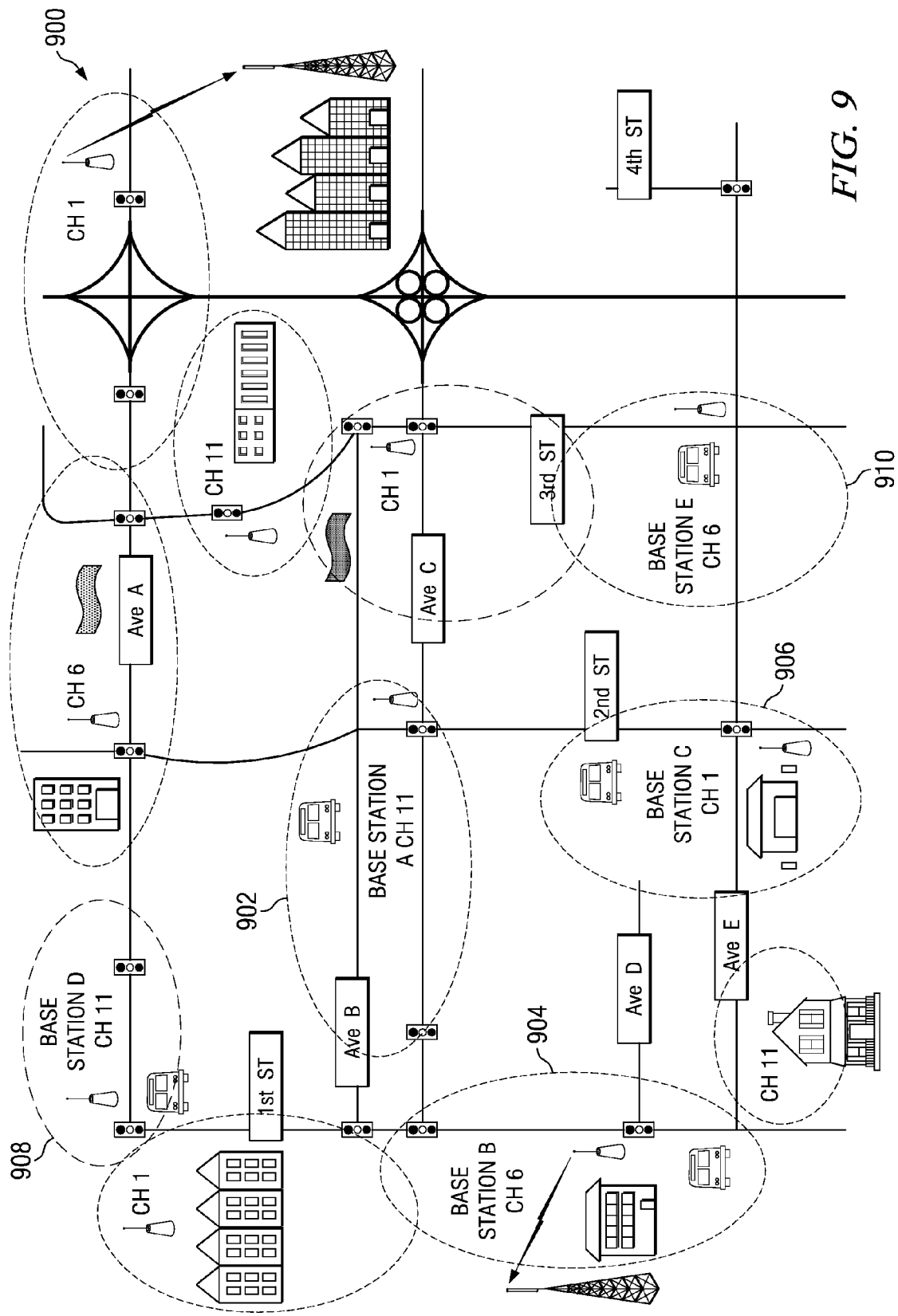
FIG. 9 is a wireless coverage map in accordance with FIG. 8.

FIG. 9 is a wireless coverage map in accordance with FIG. 8. Wireless coverage map 900 includes the fields of table 800 of FIG. 8. Particularly shown, are the location, preferred channel, frequency, and base station association. Within each of the locations shown, the mobile wireless platform operates at a specified channel to ensure connectivity of the mobile wireless platform with the base station and other wireless devices.

Within location 1 902, the mobile wireless platform operates on channel 11 and is associated with base station A. Within location 2 904, the mobile wireless platform operates on channel 6 and is associated with base station B. Within location 3 906, the mobile wireless platform operates on channel 1 and is associated with base station C. Within location 4 908, the mobile wireless platform operates on channel 11 and is associated with base station D. Within location 5 910, the mobile wireless platform operates on channel 6 and is associated with base station E.

Location 1 902, location 2 904, location 3 906, location 4 908, and location 5 910 correspond to location 802 of FIG. 8. In particular, within each location, the mobile wireless platform continues to communicate with the base station according to thresholds, such as minimum signal level threshold 810 and minimum signal to noise ratio 812 of FIG. 8. Once the threshold is exceeded, the mobile wireless platform switches to the next channel. The shift to a new channel may be based upon real-time or near real-time detection of radio frequency conditions to minimize interference.

Historic log analysis may also be used to allow location-based tuning to anticipate periodic changes in the wireless environment. By logging the radio frequency characteristics and historic broadcasts, patterns may be discovered which are repetitive in nature. In some cases, specified geographic locations always have the same radio frequency characteristics. Once a pattern is discovered, broadcasts to mobile radio frequency devices of appropriate channel configurations may become more accurate and timelier. Historical log analysis may be saved in historic log analysis of a database, such as historic log analysis 422 of database 418, both of FIG. 4.

For example, a large factory located near a railroad and interstate generates significant radio frequency noise/interference for a three city block radius from the hours of 7:30 AM to 5:30 PM. An external detector located near the factory may discover the interference on channels 4-7, and during the hours between 7:30 AM to 5:30 PM broadcasts suggests a channel configuration of channels 1-3 and 8-12 to avoid interference. Over time, analysis of consistent reporting is logged and weighted for accurate suggestions that a mobile wireless platform and other wireless devices should configure for specific channels during certain times and in certain geographic locations.

Different boundary condition switching options may be used based on the location discovery technique used. For most location discovery techniques, the radio frequency environments may be considered very well-defined and well-predicted by geographic location. In general, each of these techniques would be put into practice by an initial assessment of radio frequency conditions at each spot along a predefined route. For instance, active monitoring and/or passive detection equipment is run through the route in question, and optimal channel information is determined for various locations.

The channel information is then stored in both or all components involved in the wireless local area network or other radio frequency transmission and reception points. Channel information may be information such as available channels, channels in use, or preferred channels. The pre-assignment of channels for each geographic location allows each device that is part of the communication path to recognize the channels which are employed when the mobile wireless platform arrives at each point. Additionally, time may also be used to consider optimal channel information for each location based on distinguished time-of-day based radio frequency characteristics.

When external measure-and-adjust sensors are used, a different method may be used for determining the optimal channel for any given location. In one embodiment, best suited for less predictable wireless environments, measurements are conducted along the route of the mobile wireless platform to determine the most critical and/or the most dynamic points of background interfering radio frequency activity. At these locations, static sensors are placed along with corresponding logic to determine the optimal channel for any given environment. Such waypoint devices will then command the mobile platform to switch to an optimal channel in an efficient manner. As a result, calculations and predications about quality of service will not have to be made on the mobile wireless platform.

Figure 10:
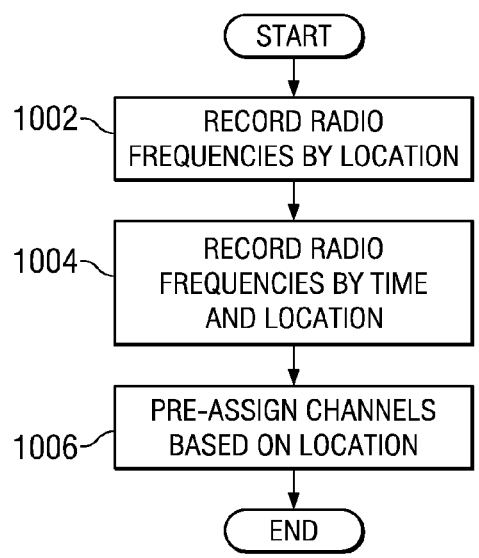
FIG. 10 is a flowchart of pattern sensing in accordance with the illustrative embodiments.

FIG. 10 is a flowchart of pattern sensing in accordance with the illustrative embodiments. The process of FIG. 10 may be implemented by a mobile wireless platform, such as mobile wireless platform 402 of FIG. 4. Alternatively, the process of FIG. 10 may also be performed by a mobile device equipped to sense radio frequencies and wireless networks or an external detector or sensors, such as external sensors 424 of FIG. 4.

The information recorded may be stored within the sensing device and later transmitted to a data processing system, such as data processing system 404 of FIG. 4. The process of FIG. 10 may be used at any time to determine radio characteristics of locations or positions along a route, such as route 622 of FIG. 6.

The process of FIG. 10 begins by recording radio frequencies by location (step 1002). The process may also record radio frequencies by time and location (step 1004). The data recorded in step 1002 and 1004 may be recorded in a historic log analysis of a database, such as historic log analysis 422 and database 418 of FIG. 4, respectively. The data recorded in steps 1002 and 1004 may also be used to establish a pattern for the locations or route evaluated. Next, the process pre-assigns channels based on location (step 1006) with the process terminating thereafter. During step 1006, the process assigns channels so that the channel used by a mobile wireless platform is able to communicate with other linked wireless devices.

FIG. 11 is a flowchart illustrating location-based tuning in accordance with the illustrative embodiments. FIG. 11 may be implemented by a mobile wireless platform, such as mobile wireless platform 402 of FIG. 4. Information gathered during the process of FIG. 11 may be passed to a data processing system, such as data processing system 404 of FIG. 4 in order to make control decisions for mobile wireless platform 402 of FIG. 4. The process of FIG. 10 may be performed prior to the process of FIG. 11 for determining radio frequency patterns in the wireless environment, such as wireless environment 600 of FIG. 6. The process of FIG. 11 is always in progress while the mobile wireless platform is transmitting and receiving a wireless signal.

The process of FIG. 11 begins with the mobile wireless platform determining its location (step 1102). The mobile wireless platform may use a global positioning system, such as global positioning system 414 of FIG. 4 to determine location. Next, the mobile wireless platform senses radio frequency conditions (step 1104). Step 1104 may be performed by a forward sensing receiver, such as forward sensing receiver 416 of FIG. 4 to determine frequency conditions.

Next, the mobile wireless platform determines whether to transition channels (step 1106). The determination of step 1106 may be based on geographic location, frequency conditions, and time. For example, the data processing system of the mobile wireless platform may access a database, such as database 418 of FIG. 4 to determine available channel information and historic log analysis information.

If the mobile wireless platform determines to transition channels, the mobile wireless platform transitions channels and tells communicating wireless devices to transition channels (step 1108) with the process returning to step 1102. The communicating wireless devices may be wireless devices, such as mobile wireless device 408, stationary wireless device 410, and wireless base station 412 of FIG. 4. If the mobile wireless platform determines not to transition channels, the process returns to step 1102.

Thus, the illustrative embodiments provide a computer implemented method, apparatus, and computer usable program code for location-based tuning for wireless devices. Channels used for wireless local area network communications or other radio frequency devices are switched to an optimal setting at an appropriate time. The mobile wireless platform may switch channels based on absolute location, time passed during travel, starts and stops, time, or signal level thresholds. In each case, the mobile wireless platform switches to a channel that permits the best possible communication at that location.

In more dynamic environments, a sensor or external device may continuously measure the radio frequency environment to dynamically determine the optimal channel based on current and past empirical data as well as geographic location. The mobile wireless platform may command interconnected wireless devices to transition channels to ensure communications functionality.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for location-based tuning for a mobile wireless platform, the method comprising:
   a computer assigning a first channel, for communication with one or more stationary wireless devices on a route being traveled by the mobile wireless platform, to one or more mobile wireless devices on the mobile wireless platform in accordance with historic data for a location and a time of day;
   the computer determining a location of the mobile wireless platform on the route being traveled by the mobile wireless platform, wherein the location is a portion of the route in which one or more of a plurality of wireless networks in a wireless environment along the route are functional and in which one or more channels cause interference with the mobile wireless platform;
   the computer receiving, from a forward sensing receiver located on the mobile wireless platform, sensor data within a boundary limit of the forward sensing receiver regarding the one or more wireless networks and the one or more channels, and in response, the computer changing the first channel to a second channel; and
   the computer, receiving a command from an external sensor at the location, and in response, the computer changing the second channel to a third channel.

2. A computer system for location-based tuning for a mobile wireless platform, comprising:
   one or more processors, one or more computer-readable memories, and one or more computer-readable tangible storage devices;
   program instructions, stored on at least one of the one or more computer-readable tangible storage devices for execution by at least one of the one or more processors via at last one of the one or more computer-readable memories, to assign a first channel, for communication with one or more stationary wireless devices on a route being traveled by the mobile wireless platform, to one or more mobile wireless devices on the mobile wireless platform in accordance with historic data for a location and a time of day;
   program instructions, stored on at least one of the one or more computer-readable tangible storage devices for execution by at least one of the one or more processors via at last one of the one or more computer-readable memories, to determine a location of the mobile wireless platform on the route being traveled by the mobile wireless platform, wherein the location is a portion of the route in which one or more of a plurality of wireless networks in a wireless environment along the route are functional and in which one or more channels cause interference with the mobile wireless platform;
   program instructions, stored on at least one of the one or more computer-readable tangible storage devices for execution by at least one of the one or more processors via at last one of the one or more computer-readable memories, to receive, from a forward sensing receiver located on the mobile wireless platform, sensor data within a boundary limit of the forward sensing receiver regarding the one or more wireless networks and the one or more channels, and in response, to change the first channel to a second channel; and
   program instructions, stored on at least one of the one or more computer-readable tangible storage devices for execution by at least one of the one or more processors via at last one of the one or more computer-readable memories, to receive a command from an external sensor at the location, and in response, to change the second channel to a third channel.

3. One or more computer-readable non-transitory storage devices having program instructions stored therein, the program instructions comprising:

program instructions to assign a first channel, for communication with one or more stationary wireless devices on a route being traveled by a mobile wireless platform, to one or more mobile wireless devices on the mobile wireless platform in accordance with historic data for a location and a time of day;

program instructions to determine a location of the mobile wireless platform on the route being traveled by the mobile wireless platform, wherein the location is a portion of the route in which one or more of a plurality of wireless networks in a wireless environment along the route are functional and in which one or more channels cause interference with the mobile wireless platform;

program instructions to receive, from a forward sensing receiver located on the mobile wireless platform, sensor data within a boundary limit of the forward sensing receiver regarding the one or more wireless networks and the one or more channels, and in response, to change the first channel to a second channel; and program instructions to receive a command from an external sensor at the location, and in response, to change the second channel to a third channel.

4. The method of claim 1, wherein the historic data includes analysis of detector data from detectors along the route.

5. The method of claim 1, wherein the route traveled by the mobile wireless platform is a random path that is not pre-established in advance of the mobile wireless platform traveling along the route.

6. The method of claim 1, wherein the computer determining the location of the mobile wireless platform on the route comprises the computer counting a number of stops completed by the mobile wireless platform while traveling on the route and the computer recognizing a geographic location at each of the stops.

7. The computer system of claim 2, wherein the historic data includes analysis of detector data from detectors along the route.

8. The computer system of claim 2, wherein the route traveled by the mobile wireless platform is a random path that is not pre-established in advance of the mobile wireless platform traveling along the route.

9. The computer system of claim 2, wherein the program instructions to determine the location of the mobile wireless platform on the route count a number of stops completed by the mobile wireless platform while traveling on the route and recognize a geographic location at each of the stops.

10. The one or more computer-readable non-transitory storage devices computer program product of claim 3, wherein the historic data includes analysis of detector data from detectors along the route.

11. The one or more computer-readable non-transitory storage devices computer program product of claim 3, wherein the route traveled by the mobile wireless platform is a random path that is not pre-established in advance of the mobile wireless platform traveling along the route.

12. The one or more computer-readable non-transitory storage devices computer program product of claim 3, wherein the program instructions to determine the location of the mobile wireless platform on the route count a number of stops completed by the mobile wireless platform while traveling on the route and recognize a geographic location at each of the stops.

\* \* \* \* \*